April 11, 1967 R. P. DANNEBAUM 3,313,881

FREQUENCY-DEPENDENT COLOR TELEVISION DISPLAY

Filed April 22, 1963 2 Sheets-Sheet 1

INVENTOR.

REX P. DANNEBAUM

BY H. Calvin White

ATTORNEYS.

INVENTOR.
REX P. DANNEBAUM
BY H. Calvin White
ATTORNEYS.

United States Patent Office 3,313,881

Patented Apr. 11, 1967

3,313,881
FREQUENCY-DEPENDENT COLOR TELEVISION DISPLAY

Rex P. Dannebaum, 45—071 Towne Ave., Indio, Calif. 92201

Filed Apr. 22, 1963, Ser. No. 274,765
12 Claims. (Cl. 178—5.4)

This invention relates generally to color television, and more particularly has to do with the production of colored picture patterns on the screen of a cathode ray or color television receiving tube.

In previous tubes of this general nature, wherein phosphors on the screen are adapted to fluoresce in different colors, color selectivity has been based upon such concepts as controlled penetration of beam electrons into a screen made up of multiple layers of phosphors, controlled electron beam density saturation of mixtures of phosphors having different emission colors, or layers of such phosphors, and selective attenuation or quenching of excitable phosphor screens by means of applied electric fields.

As distinct from prior methods of obtaining color selectivity the present invention makes use of mixtures of certain particular phosphors on the screens of cathode ray and television receiving tubes of otherwise ordinary construction, these particular phosphors being known to those skilled in the art, and being characterized by fluorescing or producing light when an alternating frequency such as an alternating electric field is applied to or across them. Further, different of these phosphors fluoresce in different colors when energized by different characteristic alternating frequencies, and each particular phosphor fluoresces maximally in its color at a characteristic frequency differing from the frequencies at which other phosphors of the mixture fluoresce maximally. Upon shifting the frequency away from the characteristic value thereof at which a particular phosphor fluoresces maximally, the fluorescent output of that phosphor diminishes rather rapidly, and it will be seen that this feature enhances color discrimination in the picture pattern produced on the tube screen composed of a mixture of such phosphors.

The fact that a mixture of different known phosphors may be made to glow or produce light of different colors in response to application thereto of an electric field of varying frequency so that the colors produced are functions of the imposed signal frequencies is described in the publications "Scientific American" for August 1957 and in "Radio and Television News" for January 1958.

Assuming the inclusion on the screen of a CR tube or television receiving tube of a mixture of these phosphors having red, green and blue fluorescent outputs, if all three characteristic frequencies are applied simultaneously and in the proper proportion to this mixture, the luminous output of the screen will be white; furthermore, any screen color can be produced by the application to the phosphor mixture of the proper composition of characteristic frequencies, and the intensity of that color determined by the density of the alternating frequencies.

While the use on the screen of a picture tube of a mixture of phosphors, each fluorescing maximally at a particular frequency, is specifically disclosed, it is also within the contemplation of the present invention that a single phosphor fluorescing in different color at different applied frequencies is also usable. It is also contemplated that layers of different frequency responsive color fluorescent phosphors are usable in conjunction with or in replacement of mixtures of such phosphors on picture tube screens.

Generally, and in accordance with the invention, the screen of the picture tube will be composed of phosphor material fluorescent in different colors in response to application thereto of different electrical signal frequencies, and in accordance with the methods disclosed the screen will be scanned by a cathode ray in a known manner to determine the location of the area of luminous activation on the screen and the intensity of the luminous output; at the same time and in proper timewise synchronization with the progress of said scanning there will be applied to the screen a signal frequency pattern varying in accordance with the picture color pattern to be produced on the screen, the alternating frequency pattern applied to the screen during a beam framing interval or time increment determining the color of the screen incremental area framed by the electron beam. As will be brought out, the application of the alternating frequency signal to the entire screen for determining the color of the incremental areas thereof scanned by the electron beam will be ineffective by itself to produce substantial fluorescence of the phosphor material, whereas the application of both the electron beam and the alternating frequency signal will be sufficient to produce desired fluorescence of the phosphor mixture as well as desired luminous output. The foregoing is based upon the experimental fact that in general the fluorescent output of a phosphor activated by two sources of energy is the sum of the fluorescent outputs of the phosphor energized by each individual source of energy, the invention utilizing this principle through the activation of the screen phosphor mixture by a subluminescent cathode ray or electron beam and simultaneously by an alternating frequency signal applied to the screen either directly or through modulation of the beam, or both, neither source of energy being capable singly of producing luminescence, but in fact producing luminescence when acting simultaneously on a given area of the screen phosphor.

These and other objects of the invention, as well as the details of an illustrative embodiment, will be more fully understood from the following detailed description of the drawings, in which.

Figure 1:
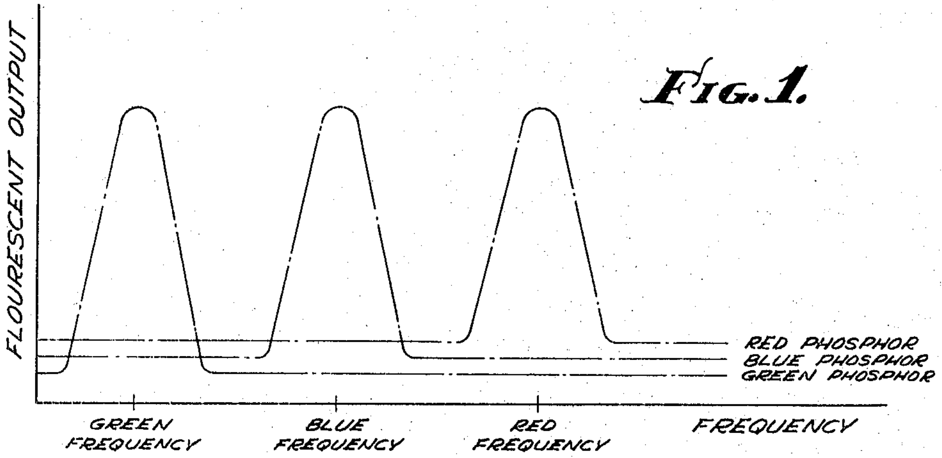
FIG. 1 is an idealized graph showing the dependence of different colored fluorescent outputs of different frequency responsive phosphor materials upon the application of different characteristic frequencies to the phosphors.
Figure 2:
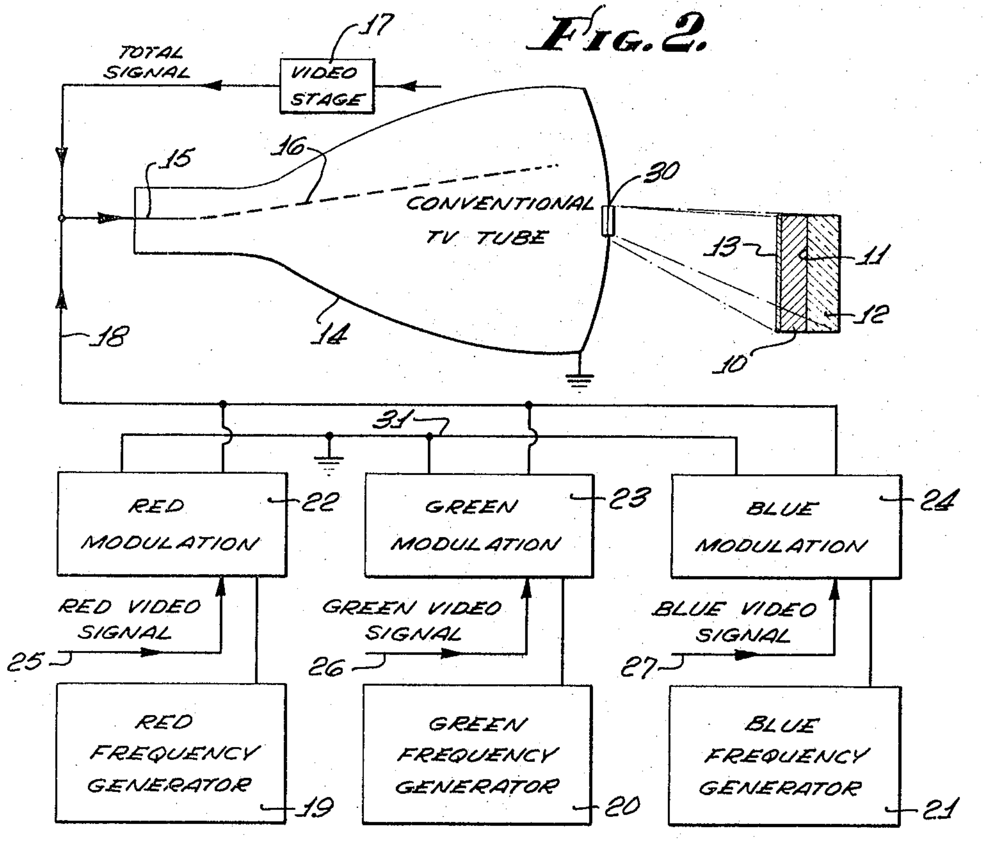
FIG. 2 shows in schematic form a typical embodiment of the present invention.
Figure 3:
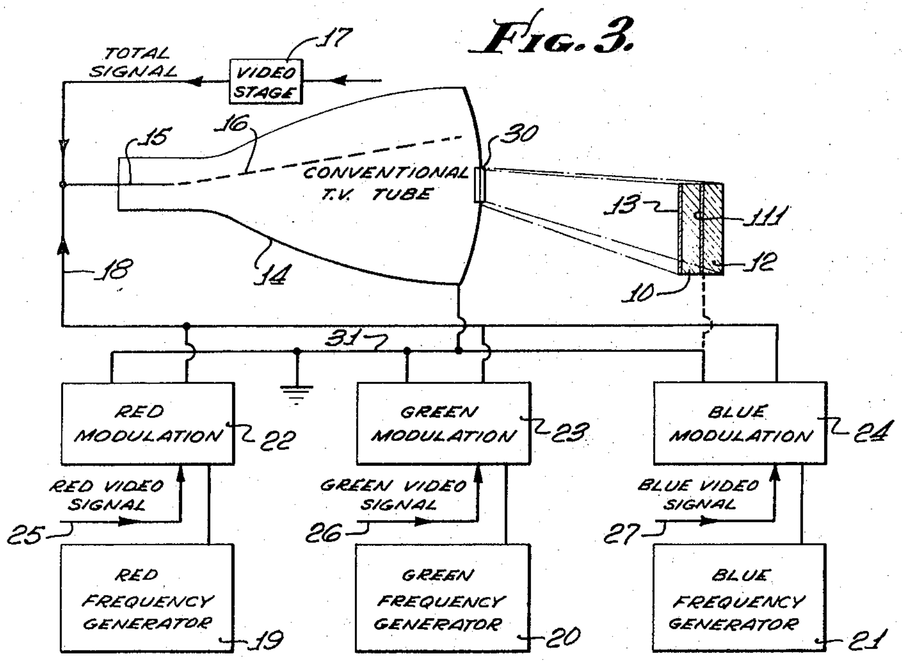
FIG. 3 shows a modified embodiment of the invention.
Figure 4:
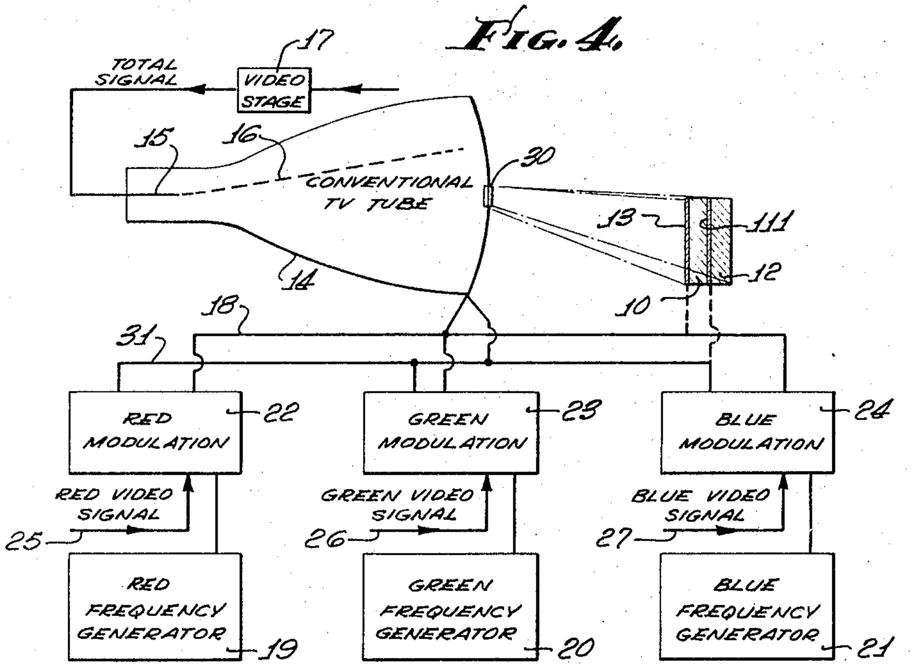
FIG. 4 shows another modified form of the invention.

From FIG. 1 it is readily understood that different phosphor materials are adapted to fluoresce maximally at particular characteristic frequencies, designated illustratively as green, blue and red frequencies correlated with the "green," "blue" and "red" phosphor materials whose fluorescent outputs are shown. In accordance with the principles of the invention, intimate mixtures of these phosphor materials, for example, red, blue and green fluorescent phosphors, are applied to the screens of cathode ray or television receiving tubes, as seen in FIGS. 2 through 4 at 10 on the enlarged incremental section of the tube screen illustrated. The phosphor mixture may be applied by conventional means and in a dielectric layer 10 of suitable thickness on the surface 11 of the glass 12, as seen in FIG. 2, or as illustrated in FIGS. 3 and 4 there may be sandwiched between the phosphor layer and the glass a relatively thin layer 111 of light transmissive electrically conductive material such as NESA glass as described in U.S. Patent No. 2,795,370 to Fromm. Backing up the phosphor layer is a relatively thin, light reflecting electrically conductive layer 13 contacting the phosphor, and typically comprising a material such as zinc oxide or aluminum.

Restricting the description first of all to the FIG. 2 embodiment, the television color receiving tube 14 shown therein is of conventional construction, except for the screen previously described, and therefore the tube input generally indicated at 15 will be understood to include suitable means for producing an electronic beam or cathode ray scanning the screen as indicated by the broken line 16. Thus, the input means at 15 may include an electron gun, and a beam deflecting system, the gun including an electron emitter cathode, a beam focusing grid, and beam accelerating electrodes. It will be understood that the intensity or brightness of incremental areal portions of the screen scanned by the beam 16 is controlled by the brightness signal feed from the video stage 17, to the input 15, for example to the beam focusing electrode or control grid, and that typically the beam voltage or energy of the electrons comprising the beam will be ineffective or insufficient to produce luminescence at the screen.

In the FIGURE 2 embodiment the input to the tube 14 is modulated by an alternating frequency signal shown as being conducted to the input through line 18, the potential or energy of such signal being sufficient when applied in modulating relation to the beam 16 to cause the latter to produce luminescence at the screen.

Signal 18 is composed of a frequency pattern determined by the generation of desired signal frequencies, for example by the "red," "green" and "blue" frequency generators 19, 20 and 21 and by the modulation of these characteristic frequencies, for example at 22, 23 and 24, by video signals, typically derived from the video stage 17 as "red," "green" and "blue" video signal inputs designated at 25, 26 and 27. Thus, for example, if during a particular framing period corresponding to the period during which a particular areal portion 30 of the screen is to be energized by the electron beam 16, it is desired that that portion 30 of the screen should luminesce or fluoresce in red color in accordance with the transmitted colored picture then appearing on the screen, the modulation of the "green" and "blue" frequencies by the "green" and "blue" video signal outputs will be such as to minimize the "green" and "blue" frequency content of the signal transmitted at 18. Thus, the application to the screen of the signal frequency pattern effects production of a colored picture pattern, since at any given framing interval during the scanning of the screen by the electric beam, only those phosphors whose characteristic frequency corresponds to that of the frequency modulation of the electron beam will fluoresce.

FIG. 3 illustrates a modified form of the invention wherein the frequency pattern signal is applied not only to the input of the receiving tube 14, but also to the screen. In particular, the positive output terminals of the modulating stages 22, 23 and 24 are connected through line 31 with the light transmissive, electrically conductive layer 111 sandwiched between the phosphor mixture 10 and the tube glass 12. Since the signal frequency pattern will then be directly applied to the entire phosphor layer, and also selectively applied thereto through modulation of the electron beam, the color selectively will be increased.

FIG. 4 illustrates a third modification of the invention, wherein the cathode ray or electron beam is not modulated by the signal frequency pattern, the latter being applied entirely to the screen in the manner shown. Thus, the positive and negative output terminal stages 22, 23 and 24 are respectively connected by lines 31 and 18 with layers 111 and 113 between which a phosphor layer 10 is sandwiched. In the showing of FIG. 4, the input from the video stage 17 to the receiving tube at 15 may be either modulated or unmodulated as respects control of the density of the sub-luminescent electron beam. Thus, the beam may be caused to have a variable electron density for varying the degree of sub-luminescence of the phosphors in accordance with the picture pattern to be produced, or the beam may have a constant electron density, and the degree of intensity or luminescence of the phosphors may be controlled entirely by application thereto of the alternating frequency signal applied across layers 13 and 111 as shown.

Phosphors whose characteristics are such that they could be successfully used in applicant's system are well known, as are the frequencies at which such phosphors will fluoresce in red, green and blue. For example, a mixture of zinc sulfide activated with lead and also with copper will fluoresce blue at 500 cycles per second applied frequency, and green at 3,000 cycles per second (Journal Electrochemical Society, vol. 100, 1953). A mixture of zinc sulfide activated with copper and manganese will fluoresce yellow at 50 cycles per second and blue at 500 cycles per second (Journal de Physique et Le Radium, vol. 15, 1954). Red fluorescing phosphors may be composed of zinc sulfide and Ag (Physical Revue 102, 1956) or zinc sulfide and GaP (Physical Review 100, 1955) and in general fluoresce at frequencies between 15,000 and 20,000 cycles per second.

A phosphor mixture sandwiched between two conductive layers 13 and 111 to which an alternating current field is applied are shown in FIGS. 3 and 4 of the drawings. The modulated electron beam supplies the A.C. signal in FIG. 3, whereas the leads 18 and 31 supply the signal to the conductive layers in FIG. 4.

With respect to the enhancement effect on cathodoluminescence, reference is made to U.S. Patent 2,863,084 to Arnott, issued Dec. 2, 1958, disclosing that certain known phosphors are capable of being energized to luminescence by cathode-rays, and that the luminescent output can be enhanced by the simultaneous influence of an alternating electric field. He mentions the use of different frequencies including 60 cycles per second. In this same regard, reference is made to the "Journal of the Electrochemical Society" for August 1959, the article entitled, "Electric Field Enhancement of Cathodoluminescence," by Philip M. Jaffe, as support for the existence of the enhancement effect. That article also discloses research results showing that the enhancement ratio (or effect) varies as a function of applied frequency for a particular phosphor and at a particular field strength.

With respect to phosphor color effects, U.S. Patent 2,937,150 to Lehmann discloses an electroluminescent phosphor which can be energized to three individual colors when excited by individual electric fields of divergent frequencies, the phosphor comprising zinc sulfide activated by copper and manganese and coactivated by a halogen. It is contemplated that such a phosphor could be used in the present system. It is also contemplated that a cathode ray tube could be operated as described herein to produce a still picture or pattern in two or more colors. In this regard, the tube illustrated and described can be considered as representing a cathode ray tube.

This application is a continuation-in-part of my earlier application entitled "Color Television," Ser. No. 730,104, filed April 22, 1958.

I claim:

1. Apparatus including a cathode ray tube for producing a colored picture pattern on the screen of said tube, said screen including phosphors fluorescent in different colors in response to application thereto of different electrical signal frequencies, said tube including means generating a scanning electron beam incident on said screen and means applying uniformly and throughout all areal portions of the screen on which the scanning beam is incident a signal frequency pattern varying in accordance with the picture color pattern to be produced on said screen, said last named means including a continuous layer of an electrical conductor applied to the electron beam side of the screen phosphor, the operation of both said means being characterized in that said beam incidence and signal application are necessary to produce visible screen phosphor fluorescence.

2. Apparatus including a color television receiving tube for producing a colored picture pattern on the screen of said tube, said screen including phosphors fluorescent in different colors in response to application thereto of different electrical signal frequencies, said tube including means generating a scanning electron beam incident on said screen and means applying uniformly and throughout all areal portions of the screen on which the scanning beam is incident a signal frequency pattern varying in accordance with the picture color pattern to be produced on said screen, said last named means including a continuous layer of an electrical conductor applied to the electron beam side of the screen phosphor, the operation of both said means being characterized in that said beam incidence and signal application are necessary to produce visible screen phosphor fluorescence.

3. Apparatus including a color television receiving tube for producing a colored picture pattern on the screen of said tube, said screen including phosphors fluorescent in different colors in response to application thereto of different electrical signal frequencies, said tube including means generating a scanning electron beam incident on said screen, generator means generating a set of said different electrical signal frequencies, means modulating said generated signal frequencies with different video signals corresponding to said colors, and means applying said modulated signal frequencies uniformly and throughout all areal portions of the screen on which the scanning beam is incident and controlling signal application and beam generation and scanning to prevent substantial fluorescence at areal portions of the screen other than at points of incidence of the beam, said last named means including a continuous layer of an electrical conductor applied to the electron beam side of the screen phosphor, said phosphors being luminescent in response to incidence thereon of said beam and application thereto of said signal.

4. The invention of claim 3 in which said generator means is operable to generate a set of signal frequencies which when applied to said phosphors will cause them to fluoresce in red, green and blue color.

5. Apparatus including a color television receiving tube for producing a colored picture pattern on the screen of said tube, said screen including phosphors fluorescent in different colors in response to application thereto of different electrical signal frequencies, said tube including means generating a scanning electron beam, generator means generating a set of said different electrical signal frequencies, means modulating said generated signal frequencies with different video signals corresponding to said colors, and means applying said modulated signal frequencies uniformly and throughout all areal portions of the screen on which the scanning beam is incident and in synchronization with beam scanning, said last named means including a continuous layer of an electrical conductor applied to the electron beam side of the screen phosphor, said phosphors being luminescent in response to incidence thereon of said beam and application thereto of said signal.

6. Apparatus including a color television receiving tube for producing a colored picture pattern on the screen of said tube, said screen including a mixture of phosphors fluorescent in different colors in response to application thereto of different electrical signal frequencies, said phosphors extending in a layer, said tube including means generating a scanning electron beam, generator means generating a set of said different electrical signal frequencies, means modulating said generated signal frequencies with different video signals corresponding to said colors, and means applying said modulated signal frequencies substantially uniformly and throughout all areal portions of the screen on which the scanning beam is incident, said last named means including continuous layers of electrical conductors at opposite sides of said phosphor layer, said phosphors being luminescent in response to incidence thereon of said beam and application thereto of said signal.

7. In combination, a cathode ray tube including a screen constituted of phosphor material luminescent in different colors in response to application thereto of different electrical signal frequencies, and means for applying to the entirety of said screen a signal frequency pattern varying in accordance with a picture color pattern to be produced on said screen, said last named means including a continuous layer of an electrical conductor applied to the electron beam side of the screen phosphor, said tube being operable to produce a scanning electron beam incident on the screen with said beam incidence and signal application both being necessary to produce screen phosphor luminescence.

8. In combination, a cathode ray tube including a screen constituted of phosphor material fluorescent in different colors in response to application thereto of different electrical signal frequencies, means for generating a scanning electron beam incident on the screen, and means for applying to said screen a signal frequency pattern varying in accordance with a picture color pattern to be produced on said screen, the operation of both said means being necessary to produce visible fluorescence of the screen phosphor, said last named means including a continuous layer of metallic, conductive material applied to the electron beam side of the screen.

9. In combination, a cathode ray tube including a screen constituted of phosphor material fluorescent in different colors in response to application thereto of different electrical signal frequencies, means for generating a scanning electron beam incident on the screen, and means for applying directly to said screen phosphor material a signal frequency pattern varying in accordance with a predetermined picture color pattern to be produced on said screen, said last named means including a continuous layer of metallic conductive material applied to the electron beam side of the screen, said means being operable in a manner such that the signal is by itself ineffective to produce substantial fluorescence of said material while said beam and signal are together effective to produce substantial fluorescence of said material receiving incidence of the beam, said phosphor being luminescent in response to incidence thereon of said beam.

10. The invention as defined in claim 9 in which said last named means includes another continuous layer of electrically conductive substance applied to the opposite side of said screen.

11. In combination, a cathode ray tube having an incremental screen portion constituted of phosphor material luminescent in different colors in response to application thereto of different electrical signal frequencies, and means for applying across said portion of the screen a varying signal frequency, siad tube being operable to produce an electron beam repeatedly incident on said screen portion, said beam incidence and said signal application both being necessary to produce screen phosphor luminescence, said means including a layer of an electrical conductor applied at the electron beam side of said screen phosphor.

12. The combination of claim 11 in which the tube has a large number of such incremental screen portions.

References Cited by the Examiner

UNITED STATES PATENTS

| | | | |
|---|---|---|---|
| 2,858,363 | 10/1958 | Kazan | 178—5.4 |
| 3,103,551 | 9/1963 | Ivey | 178—5.4 |

DAVID G. REDINBAUGH, *Primary Examiner.*

J. A. O'BRIEN, *Assistant Examiner.*